(12) United States Patent
Hauber et al.

(10) Patent No.: US 9,186,869 B2
(45) Date of Patent: Nov. 17, 2015

(54) COMPOSITE FLOOR UNDERLAYMENT WITH THERMOPLASTIC COATINGS

(75) Inventors: Robert J. Hauber, Tampa, FL (US); Gerald D. Boydston, Cody, WY (US)

(73) Assignee: CertainTeed Gypsum, Inc., Tampa, FL (US)

( * ) Notice: Subject to any disclaimer, the term of this patent is extended or adjusted under 35 U.S.C. 154(b) by 0 days.

(21) Appl. No.: 13/491,744

(22) Filed: Jun. 8, 2012

(65) Prior Publication Data

US 2012/0308795 A1 Dec. 6, 2012

Related U.S. Application Data

(63) Continuation-in-part of application No. 12/480,159, filed on Jun. 8, 2009, now Pat. No. 8,486,516.

(60) Provisional application No. 61/093,167, filed on Aug. 29, 2008.

(51) Int. Cl.
*B32B 13/02* (2006.01)
*B32B 7/02* (2006.01)
*B32B 13/14* (2006.01)
(Continued)

(52) U.S. Cl.
CPC ............... *B32B 13/14* (2013.01); *B32B 5/022* (2013.01); *B32B 5/145* (2013.01); *B32B 5/28* (2013.01); *B32B 17/04* (2013.01); *B32B 27/12* (2013.01); *B32B 27/306* (2013.01); *B32B 27/308* (2013.01); *C04B 28/14* (2013.01); *E04C 2/043* (2013.01); *B32B 2260/021* (2013.01); *B32B 2260/044* (2013.01); *B32B 2260/046* (2013.01); *B32B 2262/101* (2013.01); *B32B 2307/102* (2013.01); *B32B 2307/3065* (2013.01); *B32B 2307/51* (2013.01); *B32B 2307/542* (2013.01); *B32B 2307/56* (2013.01); *B32B 2307/7265* (2013.01); *B32B 2307/73* (2013.01); *B32B 2307/744* (2013.01); *C04B 2111/00405* (2013.01); *C04B 2111/00612* (2013.01); *C04B 2111/60* (2013.01); *Y10T 428/24992* (2015.01); *Y10T 442/674* (2015.04)

(58) Field of Classification Search
USPC ............................................ 428/218; 442/394
See application file for complete search history.

(56) References Cited

U.S. PATENT DOCUMENTS

| 2,806,811 A | 9/1957 | Von Hazmburg |
| 3,993,822 A | 11/1976 | Knauf et al. |

(Continued)

FOREIGN PATENT DOCUMENTS

| CA | 2070489 A | * 12/1993 |
| JP | 58076564 A | 5/1983 |

(Continued)

*Primary Examiner* — Tahseen N Khan
(74) *Attorney, Agent, or Firm* — GrayRobinson P.A.; Michael J. Colitz, III

(57) ABSTRACT

Disclosed is a flooring system consisting of a slab (or base) floor, a floor covering, and a composite underlayment extending between the slab floor and floor covering. The composite underlayment may include, for example, one or more set gypsum layers with embedded fibrous mats. An exterior plastic coating is mechanically adhered to an underlying set gypsum layer. The plastic coating chemically bonds and cross-links with polymer additives within the set gypsum core. The result is an underlayment that is a fully integrated polymer matrix with greatly improved durability and surface strength with only minimal increases in cost or weight.

8 Claims, 2 Drawing Sheets

(51) Int. Cl.
  *C04B 28/14* (2006.01)
  *E04C 2/04* (2006.01)
  *B32B 5/02* (2006.01)
  *B32B 5/14* (2006.01)
  *B32B 5/28* (2006.01)
  *B32B 17/04* (2006.01)
  *B32B 27/12* (2006.01)
  *B32B 27/30* (2006.01)
  *C04B 111/00* (2006.01)
  *C04B 111/60* (2006.01)

(56) References Cited

U.S. PATENT DOCUMENTS

| | | | |
|---|---|---|---|
| 4,255,485 A | 3/1981 | Yau | |
| 4,265,979 A | 5/1981 | Baehr et al. | |
| 4,378,405 A | 3/1983 | Pilgrim | |
| 4,563,392 A | 1/1986 | Harpell et al. | |
| 5,102,728 A | 4/1992 | Gay et al. | |
| 5,112,678 A | 5/1992 | Gay et al. | |
| 5,397,631 A | 3/1995 | Green et al. | |
| 6,254,817 B1 | 7/2001 | Cooper et al. | |
| 6,524,679 B2 | 2/2003 | Hauber et al. | |
| 6,673,177 B2 * | 1/2004 | Buckwalter et al. | 156/71 |
| 6,746,781 B2 | 6/2004 | Francis et al. | |
| 6,866,492 B2 | 3/2005 | Hauber et al. | |
| 6,977,111 B2 * | 12/2005 | Yamaguchi et al. | 556/1 |
| 7,138,346 B2 | 11/2006 | Bush et al. | |
| 7,354,876 B2 * | 4/2008 | Porter et al. | 442/172 |
| 7,393,799 B2 | 7/2008 | Porter | |
| 2002/0102390 A1 * | 8/2002 | O'Neill et al. | 428/192 |
| 2003/0118377 A1 | 6/2003 | Hirano | |
| 2004/0142618 A1 * | 7/2004 | Porter | 442/266 |
| 2005/0202742 A1 * | 9/2005 | Smith et al. | 442/256 |
| 2007/0015424 A1 * | 1/2007 | Toas et al. | 442/59 |
| 2007/0077436 A1 | 4/2007 | Naji et al. | |
| 2007/0093159 A1 | 4/2007 | Kajander | |
| 2007/0141931 A1 | 6/2007 | Nandi et al. | |
| 2007/0197114 A1 | 8/2007 | Grove | |
| 2008/0057318 A1 | 3/2008 | Adzima et al. | |
| 2009/0186549 A1 | 7/2009 | Bennett | |
| 2009/0208714 A1 | 8/2009 | Currier et al. | |
| 2010/0055431 A1 | 3/2010 | College | |
| 2011/0256372 A1 | 10/2011 | Hauber et al. | |

FOREIGN PATENT DOCUMENTS

| | | |
|---|---|---|
| JP | 2005297254 A | 10/2005 |
| KR | 20020076428 | 10/2002 |

\* cited by examiner

COMPOSITE FLOOR UNDERLAYMENT WITH THERMOPLASTIC COATINGS

CROSS-REFERENCE TO RELATED APPLICATIONS

This application claims priority to, and is a continuation-in-part of, U.S. application Ser. No. 12/480,159 filed on Jun. 8, 2009 and entitled "Plastic Coated Composite Building Boards and Method of Making Same." The '159 application, in turn, claims priority to provisional application Ser. No. 61/093,167 filed on Aug. 29, 2008. The contents of both these applications are fully incorporated herein for all purposes.

BACKGROUND OF THE INVENTION

1. Field of the Invention

This invention relates to an improved flooring system. More particularly, the present invention relates to a flooring system that utilizes a composite underlayment.

2. Description of the Background Art

Flooring systems generally include a structural subfloor, which can be a concrete slab or wooden foundation. An underlayment is then installed over the subfloor to provide a smooth surface for the application of a floor covering. It is known in the art to use gypsum-based building materials as a flooring underlayment. Gypsum-based building materials are generally constructed by depositing a layer of cementitious gypsum slurry between two opposing paper liners. Gypsum slurry is the semi-hydrous form of calcium sulfate and has many physical characteristics that make it suitable for use as a building component. For example, gypsum boards generally have a smooth external surface, a consistent thickness, and allow for the application a covering, such as tiles or wood flooring. Gypsum-based buildings materials are desirable because they provide a degree of fire resistance and sound abatement.

An example of a gypsum-based floor underlayment is disclosed in U.S. Pat. No. 7,651,564 to Francis and assigned to Georgia-Pacific Gypsum, LLC. The Francis patent illustrates a high strength floor underlayment comprising a dry mixture of beta type gypsum, fly ash, a water reducing aid, and a conventional set retarder.

U.S. Pub. No. 20060264548 to Liu discloses a surface enhancing coating for gypsum-containing floor underlayments. The coating prepares an underlayment to receive an adhesive and includes a water-soluble latex primer, a defoamer, and a dual-function surface enhancing agent. The surface enhancing agent includes a set accelerator that also functions to cross link the adhesive and harden the surface of the underlayment.

Additionally, U.S. Pat. No. 6,673,177 to Buckwalter and assigned to Armstrong World Industries, Inc. discloses a pre-glued underlayment assembly. The assembly comprises a substantially rigid underlayment having an adhesive layer disposed on the upper surface. A release layer is disposed over the adhesive. Another pressure sensitive layer and another release layer are optionally provided on the lower surface of the underlayment. Furthermore, one or more performance enhancing layers, such as a foam layer or solid layer, can be disposed between the underlayment and the adhesive layer.

Although the above referenced flooring constructions achieve their own individual objectives, there exists a need in the art for a flooring underlayment with improved physical properties. More specifically, there exists a need in the art for an underlayment that can provide enhanced flexibility, water repellency, fire resistance, friction, shear resistance, and load carrying capacities. There is also a need in the art for an underlayment that provides these physical properties without unduly increasing weight or cost. The present invention is aimed at achieving these and other objectives.

SUMMARY OF THE INVENTION

One of the advantages of the present disclosure is realized by providing a flooring system that includes a composite underlayment that extends between a slab floor and a floor covering.

Another advantage is realized by providing a pre-applied performance enhancing coating to a floor underlayment.

Yet another advantage is appreciated by increasing the durability and load carrying capacity of underlayment via application of a thermoplastic coating.

Still yet another advantage is obtained by increasing the sound dampening characteristics of underlayment via the application of a thermoplastic coating.

Another advantage to is realized by enhancing the moisture repelling characteristics of floor underlayment via a thermoplastic coating.

It is also an advantage of the present disclosure to increase the flexibility of a flooring system via a composite underlayment employing a plastic coating.

It is another advantage of the present disclosure to increase the durability, flexibility, and load carrying capacity of a floor covering without any detrimental increases in weight or cost.

Another advantage is realized by coating a floor underlayment with a polymer that yields specific physical properties depending upon the intended use of the underlayment.

A still further advantage is attained by providing a multi-layer underlayment wherein an external polymer coating is cross-linked to polymer additives present within the underlayment core.

Another advantage is realized by providing an underlayment that has desired physical properties without the need for installing secondary cushioning and/or sound suppressing membranes.

Yet another advantage is realized by providing an underlayment that provides a low and uniform coefficient of friction for the attached flooring, thereby eliminating the need to roll out and attach a membrane between the floor and the underlayment.

These and other advantages are carried out by providing a composite underlayment between a slab floor and a floor covering. The underlayment includes a core of a set gypsum, a mat embedded into the set gypsum core, and an external layer of a hot melt thermoplastic.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

20(a) Adhered Flooring System
20(b) Floating Flooring System
22 Slab Floor
24 Laminated Flooring
26 Adhesive
28 Underlayment
32 Set Gypsum Core
34 Upper Surface of Gypsum Core
36 Lower Surface of Gypsum Core
38 Mat
42 Dense Gypsum Layer
44 Gypsum Boundary Layer
46 Plastic Coating
48 Wood Flooring

DETAILED DESCRIPTION

The present invention relates to flooring system. More specifically, the present invention relates to a flooring system consisting of slab (or base) floor, a floor covering, and a composite underlayment extending between the slab floor and floor covering. The composite underlayment may include, for example, one or more set gypsum layers with embedded fibrous mats. In accordance with the disclosure, an exterior plastic coating is mechanically adhered to an underlying set gypsum layer. The plastic coating chemically bonds and cross-links with polymer additives within the set gypsum core. The result is an underlayment that is a fully integrated polymer matrix with greatly improved durability and surface strength with only minimal increases in cost or weight. Additionally, the plastic coating eliminates the need for the installation of secondary cushioning, sound suppressing membranes, or moisture absorbing materials.

Figure 1:
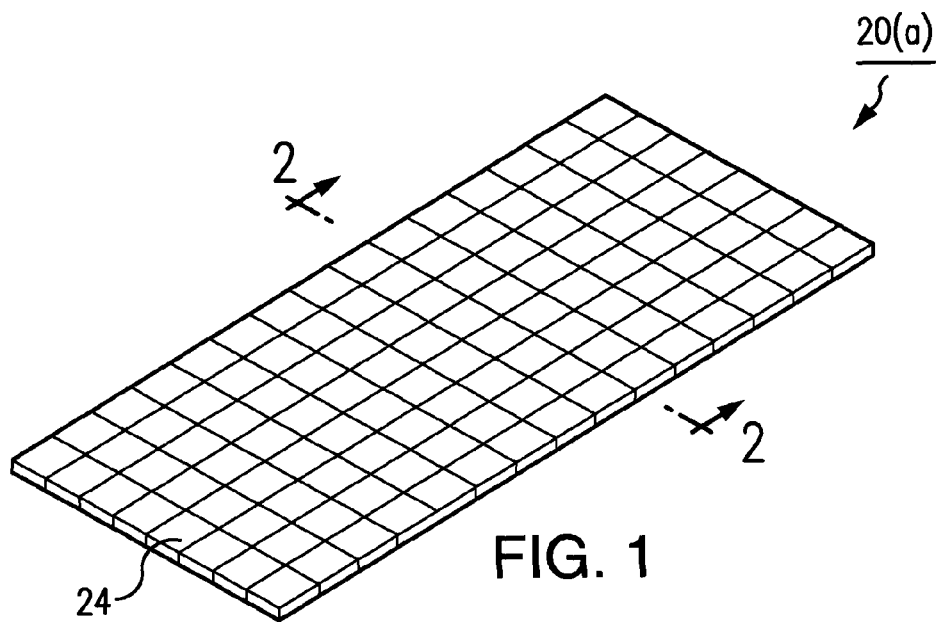
FIG. 1 is a perspective view of the flooring system of the present disclosure.

As noted in FIG. 1, flooring system 20 is generally formed from a base or slab 22. In the depicted embodiment, slab 22 takes the form of a concrete foundation. A floor covering 24 is positioned over top of slab 22. An underlayment 28 extends between the slab 22 and covering 24. Floor covering 24 can be ceramic and/or composite flooring tiles, linoleum floor coverings, or peel and stick flooring. These types of flooring 24 are generally adhered to the upper surface of underlayment 28 via an adhesive 26. This results in an adhered flooring system 20(a) (note FIGS. 1-2). However, system 20 can likewise be used in connection with floating flooring systems 20(b) (note FIGS. 3-4) such as laminated synthetic or natural wood flooring 48. In such instances, there is no adhesive required between underlayment 28 and flooring 24.

Composite Underlayment

Figure 2:
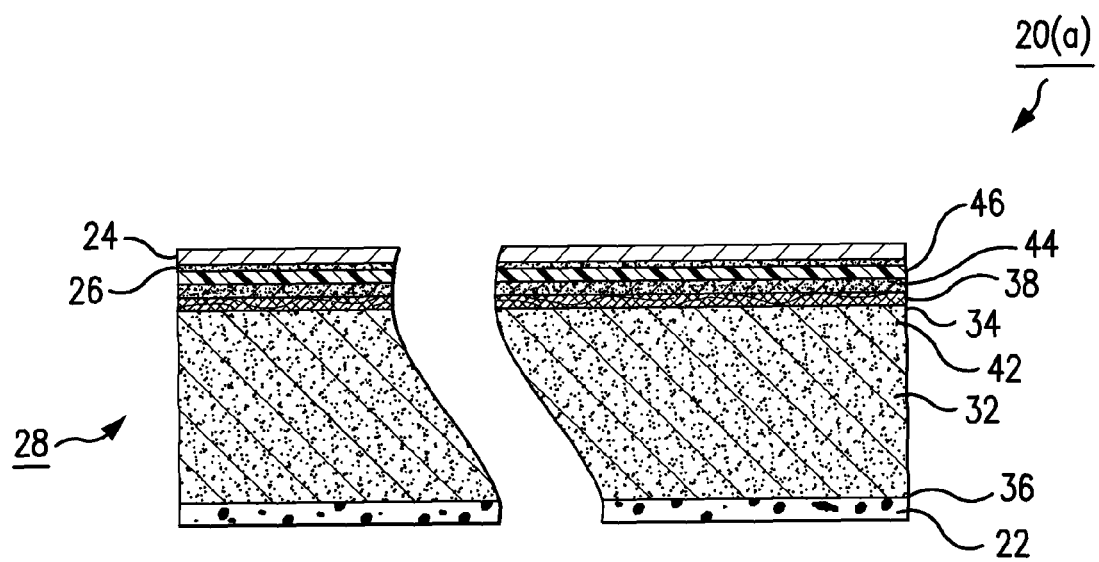
FIG. 2 is a cross section of the disclosed flooring system as taken along line 2-2 of FIG. 1.
Figure 3:
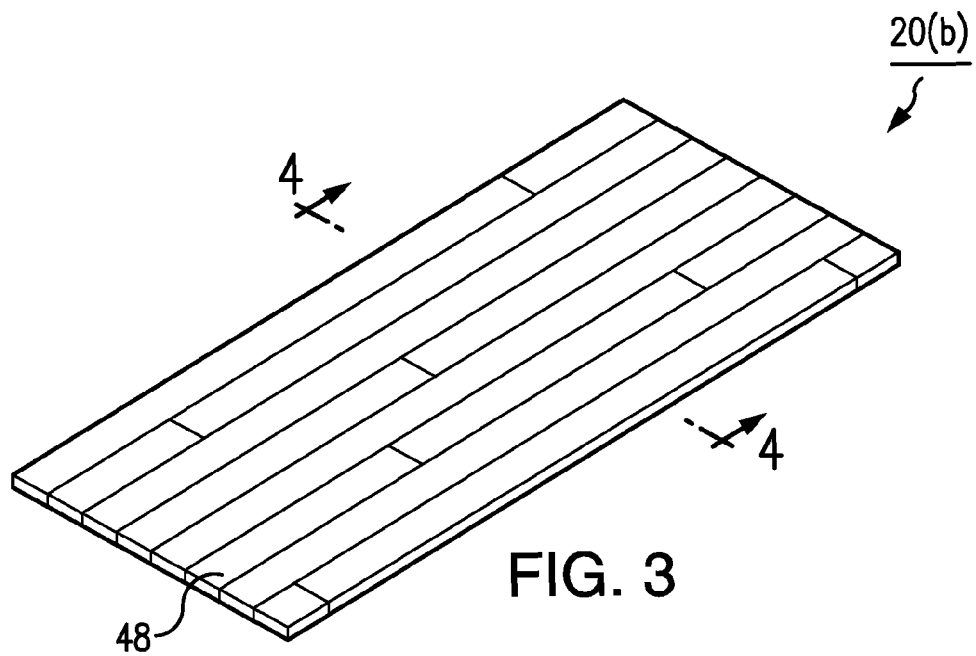
FIG. 3 is a perspective view of an alternative flooring system of the present disclosure.

FIG. 2 illustrates the composite cross section of the disclosed flooring system 20(a). As illustrated, the major component of the underlayment is a core 32 preferably formed from set gypsum. Core 32 can be produced from any of a variety of well-known gypsum board manufacturing techniques. Core 32 fully extends between a lowermost slab 22, which may be a concrete slab, and an upper mat 38. Core 32 can be formed from one or more gypsum boards. Gypsum board is typically formed in long sheets in a continuous production line process. The sheets are thereafter cut to a desired length. Boards are produced in standardized widths of either 4 or 9 feet, depending upon the intended use. Accordingly, the underlayment 28 made in accordance with this disclosure may likewise be formed in standardized widths of 4 or 9 feet. However, the present invention is by no means limited to any specific board dimensions or geometry. As noted in more detail hereinafter, set gypsum core 32 includes both upper and lower surfaces (34 and 36, respectively).

With continuing reference to FIG. 2, a fibrous mat 38 is embedded within the upper surface 34 of gypsum core 32. The embodiment of mat 38 into core 32 preferably occurs during the manufacture of underlayment 28 at a point prior to gypsum core 32 setting. In the preferred embodiment, mat 38 is formed from a grouping of nonwoven and randomly aligned fibers that are held together in a binder. Suitable binders include resins, such as urea-formaldehyde. The fibers of mat 38 are preferably long inorganic fibers, such as glass fibers. The fibers can also be continuous or non-continuous or blends of both. The fibers can be formed from organic or inorganic filaments. In one embodiment, mineral fibers are used. Small diameter fibers are preferred; namely, fibers with an average diameter of between approximately 13-16 µm. The resulting mat 38 is sufficiently porous to allow for the passage of gypsum slurry between the individual fibers prior to core 32 setting. This permits the interior and exterior faces of mat 38 to be coated, or substantially coated, with gypsum slurry. Although mat 38 is preferably porous, it nonetheless serves to strengthen the face of underlayment 28. Suitable fiber mats are more fully described in commonly owned U.S. Pat. No. 6,524,679 to Hauber, the contents of which are fully incorporated herein. Furthermore, as described below, mat 38 preferably incorporates a pre-coating in order to increase the bonding strength between the various layers of the composite underlayment 28.

Core 32, in the preferred embodiment, is formed from two or more layers of varying gypsum density. More specifically, core 32 includes a central extent of a first density and an upper dense gypsum layer 42 that is formed adjacent the upper surface 34 of core 32. As described in U.S. Pat. No. 6,524,679 to Hauber, this construction has the added benefit of strengthening the exterior faces of underlayment 28 without unnecessarily increasing the overall weight. During the manufacturing process, rollers are used to push a layer of dense slurry through the pores within mat 38. Because mat 38 is porous, the dense gypsum slurry is allowed to fully penetrate mat 38. As a result, and as depicted in FIG. 2, a layer of dense gypsum slurry substantially covers both the internal and external faces of mat 38. The interior extent of the dense slurry layer 42 contact gypsum core 32. The dense slurry layer 42 also forms a thin boundary layer 44 of between 0.01 to 2.0 millimeters (mm) as measured from the exterior surface of fiber mat 38. Once the gypsum sets, a set layer of dense gypsum 42 is formed at the upper surface 34 of core 32. Boundary layer 44 also sets to form a set dense gypsum layer.

Boundary layer 44 thereby forms a topography that undulates into and out of the underlying mat 38 but which nonetheless covers the individual fibers of mats. Alternatively, boundary layer 44 can form a uniform and smooth covering surface over mat 38. In either event, complete embodiment of mat 38 is achieved as a result of the slurry penetration. In the preferred embodiment, the slurry penetrates between 95% to 100% of mat 38 and forms a smooth and relatively level and uniform polymer modified composite dense gypsum outer surface layer. Boundary layer 44 also interfaces with the external plastic coating 46 as illustrated in FIG. 2. As illustrated, plastic coating 46 cures to form the exterior surface of underlayment 28. Plastic coating 46 prevents fibers from mat 38 from being exposed.

The outer dense gypsum layer 42 and the gypsum core 32 preferably both include a polymer additive to increase the overall durability and surface strength of the board. The polymer additive also preferably facilitates a strong chemical bond between itself and the exterior plastic coating 46 and a pre-coating applied to mat 38. Suitable polymer additives will provide a root structure to which coating 46 can attach. Suitable polymeric compounds may include, for example, polyvinyidene chloride (PVDC), or polyvinylchloride (PVC), or similar polymers. Another suitable polymer additive is a functionalized styrene butadiene (SBD) latex that is available from Omnova Solutions of Fairlawn, Ohio. Yet another suitable additive is silane or a functionalized silane (SiH.sub.4). Silane compounds are ideally used in conjunction with other polymers to facilitate coupling between the polymer and glass fibers. Silane is also known as a stabilizing agent. Suitable silane compounds are sold by Down Corning. Still yet other polymer additives are described in U.S. Pat. No. 6,524, 679 to Hauber. Whatever additive is utilized, it should be capable of providing covalent, allyl, Vanderwal, single and/or double bonding to the exterior plastic coating 46.

External Plastic Coating

Plastic coating 46 is ideally chosen to give the exterior surface of underlayment 28 enhanced surface strength and load carrying capacity. Plastic coating 46 generally eliminates the need for installation of a secondary cushioning and or sound suppressing membrane above the underlayment (as is standard installation practice when installing a floating floor on top of, or above a preinstalled flooring underlayment). The thermoplastic coated application surface 46 of underlayment 28 serves to provide desired cushioning and sound suppression thereby reducing the cost labor required to complete specified installation. Other desirable characteristics provided by coating 46 include flexibility, and water, mold and mildew resistance. Moreover underlayment 28 also provides a superior bonding substrate for the installation of ceramic and composite floor tile systems. Coating 46 can be any of a variety of synthetic, semi-synthetic, or organic polymers. Both reactive and nonreactive polymers can be used. Isotactic and atactic polymers can likewise be used.

Plastic coating 46 also offers improved bonding failure resistance as it has no glass transition strength and, therefore, offers a level of elastomeric give. This is a forgiving quality that assists in maintaining the bond between flooring 24 and underlayment 28. Conventional underlayment, by contrast, is entirely composed of cementitious material and maintains a glass transition strength. As a result conventional underlayment is friable and prone to cracking.

Floating floors 48 require underlayment with a relatively low and uniform coefficient of friction in order to reduce chances of buckling during expansion. Such expansion may be brought about by environmental changes, such as changes in humidity. Plastic coating 46 in beneficial in this regard as it provides a relatively low and uniform coefficient of friction relative to floating flooring 48 (note FIGS. 3-4). This reduces the opportunities for buckling of the flooring system as it expands and contracts. It also eliminates the need for installation of a rolled out membrane between the floor and the underlayment.

Adhered flooring 24 (note FIGS. 1-2) requires shear resistance to resist settling movements and prevent bonding failures and the release of ceramic or composite flooring tiles. Underlayment 28 is beneficial in that it provides a level of shear resistance and therefore resists the effect of settling movements. Underlayment 28 also resists foot traffic generated failures wherein a raised area is formed under the underlayment 28 and the installed flooring 24. As a result of the elastomeric give of underlayment 28, a bond is maintained with flooring 24 despite the presence of such raised areas.

Additionally, multilayer laminated polymer coatings can be used to provide even greater strength and durability. When a polymer coating 46 according to the present invention has been applied to core 32, the top-most coating then can serve as an additional foundation on which other coatings and/or laminates can be applied. The properties of the different layers may be made compatible so as to form a strong chemical bond between the successively applied layers. This results in laminates with strong bonding capabilities. The laminated layers can also be incorporated into, or made to form, complete composite structures. It is further noted that the external thermoplastic layer 46 can be used for an underlayment 28 that does not include a fibrous mat 38. For example, a paper facing layer can be used in lieu of mat 38.

The following is a list of various polymers that can be used, either individually or in combination with one another, for polymer coating 46: Acrylonitrile butadiene styrene (ABS), Celluloid, Cellulose Acetate, Ethylene-Butyl, Acrylate, Ethylene-Methyl Acrylate, Ethylene Vinyl Acetate (EVA), Ethylene-Acrylic-Acid-copolymer (EAA); Ethylene Vinyl Alcohol (EVAL), Fluoroplastics (PTFEs, including FEP, PFA, CTFE, ECTFE, ETFE), ionomers, Liquid Crystal Polymer (LCP), Polyacetal (POM or Acetal), Polyacrylates (Melt and Cure Acrylics), Polyacrylonitrile (PAN or Acrylonitrile), Polyamide (PA or Nylon), Polyamide-imide (PAI), Polyaryletherketone (PAEK or Ketone), Polybutyadiene (PBD), Polybutylene (PB), Polybutylene Terephthalate (PBT), Polybutylene Terephthalate (PET), Polycyclohexylene Dimethylene Terephthalate (PCT), Polycarbonate (PC), Polyketone (PK), Polyester, Polyethylene/Polythene/Polyethane, Polyether Block Amide (PEBA), Polyetheretherketone (PEEK), Polyetherimide (PEI), Polyethersulfone (PES), Polyethylenechlorinates (PEC), Polyimide (PI), Polyactic Acid (PLA), Polymethylpentene (PMP), Polyphenylene Oxide (PPO), Polyphenylene Sulfide (PPS), Polyphthalamide (PPA), Polypropylene (PP), Polystyrene (PS), Polysulfone (PSU), Polyvinyl Chloride (PVC), Spectralon, and thermoplastic Olefinic Elastomers (TPO).

Of these, it is preferred to use a hot melt thermoplastic with a melting point of between 100.degree. F. to 500.degree. F. Either natural or synthetic holt melt thermoplastics can be used. Additionally, the present inventors have determined that hot melt thermoplastics having a melting point within the specified range allows a plastic coating to be applied in a liquefied form without calcining the underlying gypsum. Preferred hot melt thermoplastics include both EVA and EAA polymers, as both have suitable melting points and otherwise provide sufficient bonding points for the polymer additives in the dense gypsum layers of the board.

In addition to the foregoing, polyolefin polymers can also be used, including polar or non-polar polyolefenic compounds, crystalline or amorphous polyolefenic compounds, natural or synthetic tackifying resins as part of polyolefenic compounds, and low viscosity polyolefenic compounds. The selected polymer can also be used to generate a variety of films, including microscopically continuous and/or non-continuous films engineered for molecular water permeability, non-oriented polymer films, planar oriented polymer films, randomly oriented polymer films, and films with low thermal conductivity.

Whatever polymer coating 46 is utilized, it should provide excellent mechanical adhesion to the underlying dense slurry layer 42 and also chemically bond to polymer additives included therein. Mechanical adhesion can be achieved via topographic mirroring of the polymeric coating 46 to the underlying dense gypsum boundary layer 42. This topographic mirroring can be accomplished by controlling the hardness and pressure of the application rollers. Topographic mirroring can also be accomplished by varying application heat, thereby employing vacuum like forces upon cooling which draws the coating into the topography, which is an unexpected result discovered by the inventors during development.

Chemical bonding between coating 46 and the underlying dense gypsum layer 42 is achieved by cross-linking polymer coating 46 with the polymer additives contained within the various slurry layers: namely, boundary layer 44, dense gypsum layer 42, and the set gypsum core 32. The respective polymers are chosen to ensure adequate cross-linking and the creation of long, high molecular weight polymer chains that extend throughout composite underlayment 28. For instance, correct selection of the polymeric coating 46 allows for the creation of ionic, valent and covalent bonding, as well as bonding via van der Waals forces. Moreover, if a nonreactive polymeric coating is selected, coating 46 will initiate with the underlying polymer additives after the coating 46 is taken through a phase change. Alternatively, if a reactive polymeric coating is selected, coating 46 will polymerize upon application to the underlying boundary layer 44.

Performance enhancing fillers and/or modifiers can also be added to polymer coating 46. These fillers and modifiers can provide any of the following physical enhancements: UV resistance, electrical conductivity, electromagnetic force (EMF) resistance, lower polymeric densities, sound attenuation, water resistance, and flame retarding, heat transfer resistance, elastomeric performance enhancers, strength modification, weather stabilization, improved esthetics, and phosphorescence, photochromatic or polychromatic enhancements.

The flame retardant properties may be chemical, intumescent, expanding, natural or synthetic. Density modifiers and sound attenuators may include gasses, for example nitrogen, solids, liquids or nano-particles, and micro-fine particulate rubbers. Strength modification may be provided by fillers or modifiers that are metals, organic or inorganic compounds, including fibrous or synthetic fiber compounds, flakes or nano materials. Weather stabilization may include synthetic and natural light stabilizers for providing protection against infrared, visible and ultraviolet light. Other stabilizers may also be added for improved performance, such as free radical scavengers, oxygen scavengers, and the like.

Figure 4:
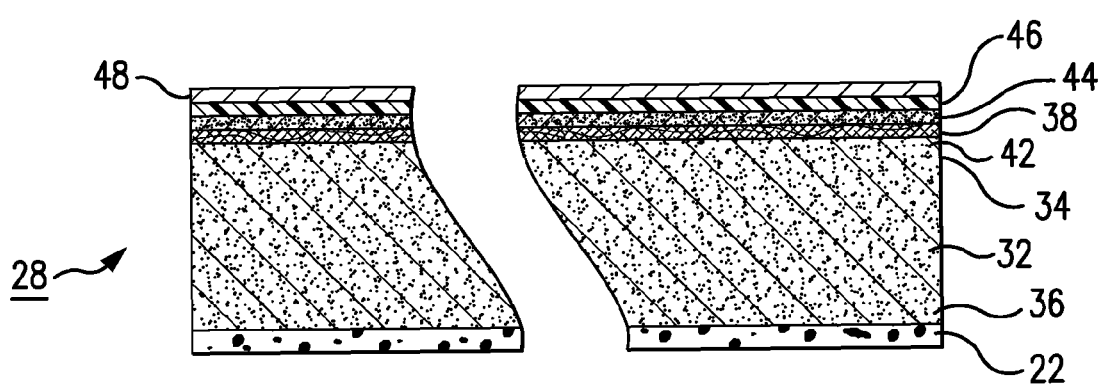
FIG. 4 is a cross section of the disclosed flooring system as taken along line 4-4 of FIG. 3.

As illustrated in the cross-sectional views of FIGS. 2 and 4, plastic coating 46 is directly applied to the gypsum boundary layer 44 that is formed on the external surface of mat 38. Polymer coating 46 can be laid down by any of a wide variety of hot melt coating applications. In the preferred embodiment, polymer coating 46 is applied in a thickness of between 0.01 to 500 mils. Although 0.01 to 500 mils is disclosed as preferred, different applications may require different thicknesses.

Additionally, injection of micro air bubbles or heat activated expanded polymeric cells or expanded polymeric cells into the molten thermoplastic prior to the thermoplastic coating 46 being applied to the polymer modified gypsum surface has resulted in another unexpected discovery of the invention herein disclosed. That is the entrained air bubbles or shallow cells can provide built in sound attenuation at the application surface of underlayment 28. Introduction of any filler material into the molten thermoplastic results in the filler becoming permanently suspended within the thermoplastic, in either a molten or cooled state. Injecting micro air bubbles into the thermoplastic during the coating process to reduce density also results in significant sound attenuation of the exposed surface on which the coating 46 has been applied. Air as used herein should be understood to include any type of gaseous materials, for example, nitrogen or an inert gas.

Pre-Coating of Fibrous Mats

In a further embodiment of the present invention, fibrous mat 38 is pre-coated with a hot melt thermoplastic prior to embodiment within dense slurry layer 42. The thermoplastic coating 46 is thereafter applied over the outer surface of underlayment 28 as described above. Any of a variety of plastics can be used to pre-coat the fibers of mat 38. Suitable plastics include any of the polymers described above in connection with external plastic coating 46. For sake of brevity, this list has not been duplicated, but is instead incorporated by reference. In the preferred embodiment, the plastic pre-coating is a hot melt thermoplastic with a melting point of between 100 degree F. and 500 degree F.; and more specifically, either an ethylene vinyl acetate (EVA) or ethylene methyl acrylonitrile (EAA). Adding a pre-coating to mat 38 yields a strong, light weight composite board with a chemical matrix that interconnects fibrous mat 38, dense slurry layer 42, boundary layer 44, and gypsum core 32.

The thermoplastic pre-coating can be applied in a smooth layer or in a layer the follows the topography of the underlying mat. In the preferred embodiment, the thermoplastic is applied in a coating that is between 0.1 to 10 mils thick. The thermoplastic pre-coating can also be filled, or not filled, colored or translucent.

Prior the pre-coating being applied, mat 38 is treated with a combination of acid, isopropyl alcohol, and a silane coupling agent. This pre-treatment step effectively prepares the individual fibers of mat 38 for the subsequent thermoplastic coating. The acid of the pre-treatment step activates binders present within the mat 38 to thereby facilitate bonding. The acid also permits the fibers of mat 38 to bind with the silane coupling agent. The silane coupling agent, in turn, ensures a tight bond between the individual fibers of mat 38 and the surrounding thermoplastic. Silane is a known coupling agent that facilitates bonding between polymers and glass fibers. Silane is also known as a stabilizing agent. Suitable silane compounds are sold by Dow Corning.

Following the pre-treatment step, the thermoplastic pre-coating is applied in a liquefied state. Any of a variety of hot melt coating techniques can be utilized in this step. The pre-coating adheres to the individual fibers of mat 38 so as to maintain the porosity of mat 38. Thus, even with pre-coating applied, mat 38 can be embedded within dense slurry layer 42. Once applied, the silane promotes bonding between the individual glass fibers and the surrounding thermoplastic. In this manner, the hot melt thermoplastic pre-coating forms a strong chemical and mechanical bond with the individual fibers of mat 38.

The silane facilitates other bonding as well. Namely, the silane promotes bonding between the thermoplastic pre-coating and binders present within mat 38. Bonding is also promoted between the thermoplastic pre-coating and the polymers present within dense slurry layer 42, set gypsum core 32 and the external thermoplastic coating 46. Still yet further bonding is promoted between the thermoplastic pre-coating and the calcium and sulfur within the surrounding gypsum. The result is a truly composite and integrated underlayment 28, with all components being chemically and mechanically bound together. Moreover, the composite underlayment 28 can be achieved with or without the thermoplastic surface 46 coating described above.

The present invention contemplates the complete replacement of traditional thermal setting binders (used to bind an organic and/or inorganic fibrous mat) with a hot melt thermoplastic polymer. An entirely thermoplastic bound fiber mat, while expected to improve manufacturing costs, has unexpectedly offered further advantages. These newly discovered advantages range from significantly improved "X", "Y", and "Z" axis strengths of the mat, as well as substantial ductility and flexibility improvements above those seen in mats incorporating traditional thermal setting binders.

The present inventors have further discovered that organic and/or inorganic fibers that are preconditioned with silane prior to the application of the hot melt thermoplastic binder, result in increased mat strength. The silane preconditioning also increases the bond at the interface between the hot melt thermoplastic and the organic and/or inorganic fibers. This, in turn, provides a "stretch" like characteristic to the mat comparably similar to that of organic muscle fibers and the known molecular memory pattern propensity for elastomeric stretch and precise rebound.

In addition to the foregoing, various fillers and additives can be included with the thermoplastic pre-coating in order to impart desired physical characteristics. For example, the pre-coating can be compounded with a gas to volumize the plastic and thereby reduce the amount of plastic needed to completely coat mat 38. Still yet other fillers can be applied to create cost savings. As those skilled in the art will realize, other additives can be included within the pre-coating to yield other properties and for instant product variation. The fillers can also be pretreated with silane upon incorporation into, or compounding with, the hot melt thermoplastic. Such pretreated fillers will be mechanically bound by the surrounding thermoplastic and will also be subsequently chemically bonded and locked into place.

Pre-coating of mat 38 can be carried out with or without application of external plastic coating 46. For instance, the pre-coated mat 38 described herein (i.e. a mat singularly coated with thermoplastic, or coated with a thermoplastic that includes silane and/or fillers) can be used in connection underlayment 28 that does not otherwise employ an exterior plastic coating 46. Alternatively, the pre-coated mat 38 can be used in conjunction with underlayment 28 utilizing other facing materials.

Underlayment 28 as described above can be manufactured using any of a variety of known manufacturing techniques. However, the preferred manufacturing technique is disclosed in commonly owned co-pending application Ser. No. 12/480, 159 filed on Jun. 8, 2009 and entitled "Plastic Coated Composite Building Boards and Method of Making Same." The contents of this co-pending application are fully incorporated herein for all purposes.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:
1. A flooring system (20) comprising:
a slab (22);
a laminate floor covering (24) overlying the slab (22), the laminate floor covering (24) constituting a walking surface;
an underlayment (28) extending between the slab (22) and the laminate floor covering (24), the underlayment comprising:
a set gypsum core (32) with a polymeric additive, the set gypsum core having an upper surface (34) and a lower surface (36), the lower surface (36) contacting the slab (22);
a mat (38) secured to the upper surface (34) of the set gypsum core (32), the mat (38) formed from non-woven, randomly aligned glass fibers held together by a binder, the mat (38) being porous and having interior and exterior surfaces;
a thermoplastic pre-coating applied to the randomly aligned glass fibers of the mat (38);
a dense gypsum layer (42) formed at the upper surface (34) of the set gypsum core (32), the dense gypsum layer (42) coating and penetrating the mat, whereby the exterior surface of the mat is substantially covered by the dense gypsum layer to form a boundary layer (44), the dense gypsum layer (42) including a polymeric additive;
a coating (46) the majority of which comprises a non-curing hot melt thermoplastic with a melting point between 100° to 500° F., the coating mechanically adhered to the boundary layer (44) and having a thickness of between 0.01 to 500 mils;
an adhesive layer (26) securing the laminate floor covering (24) to the coating (46);
the coating (46) being chemically bonded to and cross-linked with the thermoplastic pre-coating and the polymeric additives in the set gypsum core (32), the boundary layer (44), and dense gypsum layer (42) to form a composite polymer matrix.

2. A flooring system (20) comprising:
a slab (22);
a flooring (24) overlying the slab (22);
an underlayment (28) extending between the slab (22) and flooring (24), the underlayment (28) comprising:
a gypsum core (32) having an upper surface (34), the gypsum core including polymeric additives;
a mat (38) having an exterior surface, the mat (38) embedded into the upper surface (34) of the gypsum core (32), whereby gypsum from core (32) substantially covers the exterior surface of the mat to form a boundary layer (44);
a coating (46) the majority of which comprises a non-curing hot melt thermoplastic, the coating (46) being positioned over the exterior surface of the mat (38) and mechanically adhered to the boundary layer (44);
a chemical bond formed between the coating (46) and the polymeric additives within the gypsum core (32) and boundary layer (44), whereby the underlayment (28) forms a laminated composite matrix.

3. The underlayment (28) as described in claim 2 wherein the coating (46) has a thickness of between 0.01 to 500 mils.

4. The underlayment (28) as described in claim 2 wherein mat (38) is formed from non-woven, randomly aligned glass fibers held together by a binder and further wherein the mat (38) is porous and has interior and exterior surfaces.

5. The underlayment (28) as described in claim 4 wherein a thermoplastic pre-coating is applied to the randomly aligned glass fibers of the mat (38).

6. The underlayment (28) as described in claim 5 wherein the pre-coating is formed from a holt melt thermoplastic with a melting point between 100° to 500° F.

7. The underlayment (28) as described in claim 2 wherein a dense gypsum layer is formed adjacent the upper surface (34) of core (32).

8. The underlayment has described in claim 7 wherein the underlayment (28) includes a polymeric additive for crossing linking the set gypsum core (32), and dense gypsum layer (42), and the coating (46) to form a composite polymer matrix.

\* \* \* \* \*